United States Patent
Iglewski (10) Patent No.: US 10,920,713 B2
(45) Date of Patent: Feb. 16, 2021

(54) COMPRESSION COWL FOR JET ENGINE EXHAUST

(71) Applicant: GENERAL ELECTRIC COMPANY, Schenectady, NY (US)

(72) Inventor: Tomasz Iglewski, Mazowieckie (PL)

(73) Assignee: General Electric Company, Schenectady, NY (US)

(*) Notice: Subject to any disclaimer, the term of this patent is extended or adjusted under 35 U.S.C. 154(b) by 518 days.

(21) Appl. No.: 15/360,080

(22) Filed: Nov. 23, 2016

(65) Prior Publication Data

US 2017/0145957 A1    May 25, 2017

(30) Foreign Application Priority Data

Nov. 23, 2015   (PL) .......................... 414889

(51) Int. Cl.
    *F02K 1/82*    (2006.01)
    *F02K 1/38*    (2006.01)
    *F02K 1/78*    (2006.01)

(52) U.S. Cl.
    CPC ............. *F02K 1/82* (2013.01); *F02K 1/386* (2013.01); *F02K 1/78* (2013.01); *F05D 2250/712* (2013.01); *Y02T 50/60* (2013.01)

(58) Field of Classification Search
    CPC ... F02K 1/386; F02K 1/82; F02K 1/48; F02K 1/78; F02K 7/16; F02K 7/10; F02K 9/78; F05D 2220/80; F05D 2220/10
    See application file for complete search history.

(56) References Cited

U.S. PATENT DOCUMENTS

| | | | | |
|---|---|---|---|---|
| 3,873,235 A | * | 3/1975 | Mendelson | F01D 7/00 416/154 |
| 3,881,315 A | * | 5/1975 | Hess | F02K 3/06 60/226.1 |
| 3,913,626 A | | 10/1975 | McMurtry | |
| 4,567,960 A | * | 2/1986 | Johnson | F02K 1/38 181/220 |
| 6,178,740 B1 | * | 1/2001 | Su | B64D 33/06 239/265.19 |
| 6,826,901 B2 | | 12/2004 | Hebert | |
| 6,969,028 B2 | | 11/2005 | Dun | |
| 7,900,433 B2 | | 3/2011 | McCall | |

(Continued)

FOREIGN PATENT DOCUMENTS

| CN | 101970844 A | 2/2011 |
|---|---|---|
| CN | 104712457 A | 6/2015 |

(Continued)

OTHER PUBLICATIONS

Search Report issued in connection with corresponding PL Application No. P-414889 dated Feb. 14, 2017.

(Continued)

*Primary Examiner* — Todd E Manahan
*Assistant Examiner* — Katheryn A Malatek
(74) *Attorney, Agent, or Firm* — McGarry Bair PC (57) ABSTRACT

A compression inner core cowl for a jet engine can have a concave annular section of the core cowl. The concave section can begin within the expanse of an outer fan cowl and extend aft of the fan cowl toward the tail cone, defining an annular bypass section between the fan cowling and the core cowling. The concave geometry of the core cowling reduces the strength of supersonic shock waves generated at the corners of the cowlings adjacent a supersonic airflow stream to increase overall efficiency of the engine.

18 Claims, 6 Drawing Sheets

(56) References Cited

U.S. PATENT DOCUMENTS

| | | | |
|---|---|---|---|
| 8,157,050 B2 | 4/2012 | Huber et al. | |
| 2002/0178711 A1 | 12/2002 | Martens | |
| 2004/0187474 A1* | 9/2004 | Martens | F02K 1/34 60/204 |
| 2005/0081509 A1 | 4/2005 | Johnson | |
| 2005/0138915 A1* | 6/2005 | Bardagi | F02K 1/48 60/262 |
| 2009/0090095 A1* | 4/2009 | Crosta | F02K 1/78 60/226.1 |
| 2010/0050651 A1 | 3/2010 | Dindar et al. | |
| 2014/0259631 A1 | 9/2014 | Bunnag et al. | |
| 2014/0301829 A1 | 10/2014 | Reinhardt et al. | |
| 2015/0033747 A1* | 2/2015 | Leyko | F02K 3/06 60/770 |
| 2015/0075169 A1 | 3/2015 | Cunningham et al. | |

FOREIGN PATENT DOCUMENTS

| | | |
|---|---|---|
| EP | 0 953 506 A2 | 11/1999 |
| EP | 1 464 822 A2 | 10/2004 |
| EP | 2215341 A2 | 8/2010 |
| FR | 2 929 334 A1 | 10/2009 |
| JP | S49-54713 A | 5/1974 |
| JP | S50-25920 A | 3/1975 |
| JP | 2011-503409 A | 1/2011 |
| WO | 2009055041 A2 | 4/2009 |
| WO | 2014/197080 A2 | 12/2014 |

OTHER PUBLICATIONS

Extended European Search Report and Opinion issued in connection with corresponding EP Application No. 16199376.1 dated Apr. 24, 2017.

First Office Action and Search issued in connection with corresponding CN Application No. 201611037277.7 dated Apr. 25, 2018.

Machine Translation and Notification of Reasons for Refusal issued in connection with corresponding JP Application No. 2016-221093 dated Dec. 5, 2017.

Machine translation and Second office action and search issued in connection with corresponding CN Application No. 201611037277.7 dated Dec. 12, 2018 (Office action translation is not available).

* cited by examiner

COMPRESSION COWL FOR JET ENGINE EXHAUST

BACKGROUND

Combustion turbine engines are rotary engines that extract energy from a flow of combusted gases passing through the engine onto a multitude of turbine blades. Turbine engines have been used for land and nautical locomotion and power generation, but are most commonly used for aeronautical applications such as propulsion of the aircraft, including helicopters. In terrestrial applications, turbine engines are often used for power generation.

For efficient operation of aircraft gas turbine engines, that is, to minimize the amount of fuel required to generate a given amount of thrust, it is necessary that the flow output of both the turbine and fan be precisely controlled as to both amount of flow and direction. Controlling the flows is achieved in general by controlling the cross sectional flow areas of the core and fan exhaust nozzles respectively, by either optimally sizing fixed area nozzles for nominal engine operating conditions or employing variable area exhaust nozzles which can be adjusted in area for optimal flow throughout a range of operating conditions. The geometric shape of the exhaust nozzles themselves controls the direction of flow therethrough.

Both the fan and core exhaust nozzles are functionally defined by components of the engine's nacelle. The nacelle includes a core cowling that provides an aerodynamically efficient cover for the core engine extending therearound and terminating at the downstream end thereof at the engine's exhaust nozzle. The nacelle also includes an outer fan cowling that surrounds the core cowling, enclosing the blades of the fan and defining with the core cowling, an annular bypass duct which terminates at the fan exhaust nozzle.

BRIEF DESCRIPTION

A high bypass gas turbine engine comprising a core comprising a compressor section, combustion section, and turbine section in axial flow arrangement. The engine further comprises a fan section upstream of an in axial flow arrangement with the core, an exhaust section downstream of and in axial flow arrangement with the core, and a core cowling surrounding the core and a portion of the exhaust section, and spaced from the exhaust section to define a core outlet between the core cowling and the exhaust section. The engine further comprises a fan cowling surrounding the fan section and a portion of the core cowling being space from the core cowling to define an angular bypass channel having a fan outlet between the fan cowling and the core cowling.

A cowling assembly for a high bypass gas turbine engine comprising a core cowling and a fan cowling surrounding at least a portion of the core cowling, and spaced from the core cowling to define an angular bypass channel having a fan outlet between the fan cowling and the core cowling. At least a portion of the core cowling immediately downstream of the outlet has a concave cross section.

A core cowling for a high bypass gas turbine engine comprising a subsonic region and a supersonic region, with an intervening transition, and a concave cross section present at least in the transition.

DETAILED DESCRIPTION

The described aspects of the present invention are directed to an exhaust system, particularly in a gas turbine engine. For purposes of illustration, the present invention will be described with respect to an aircraft gas turbine engine. It will be understood, however, that the invention is not so limited and can have general applicability in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
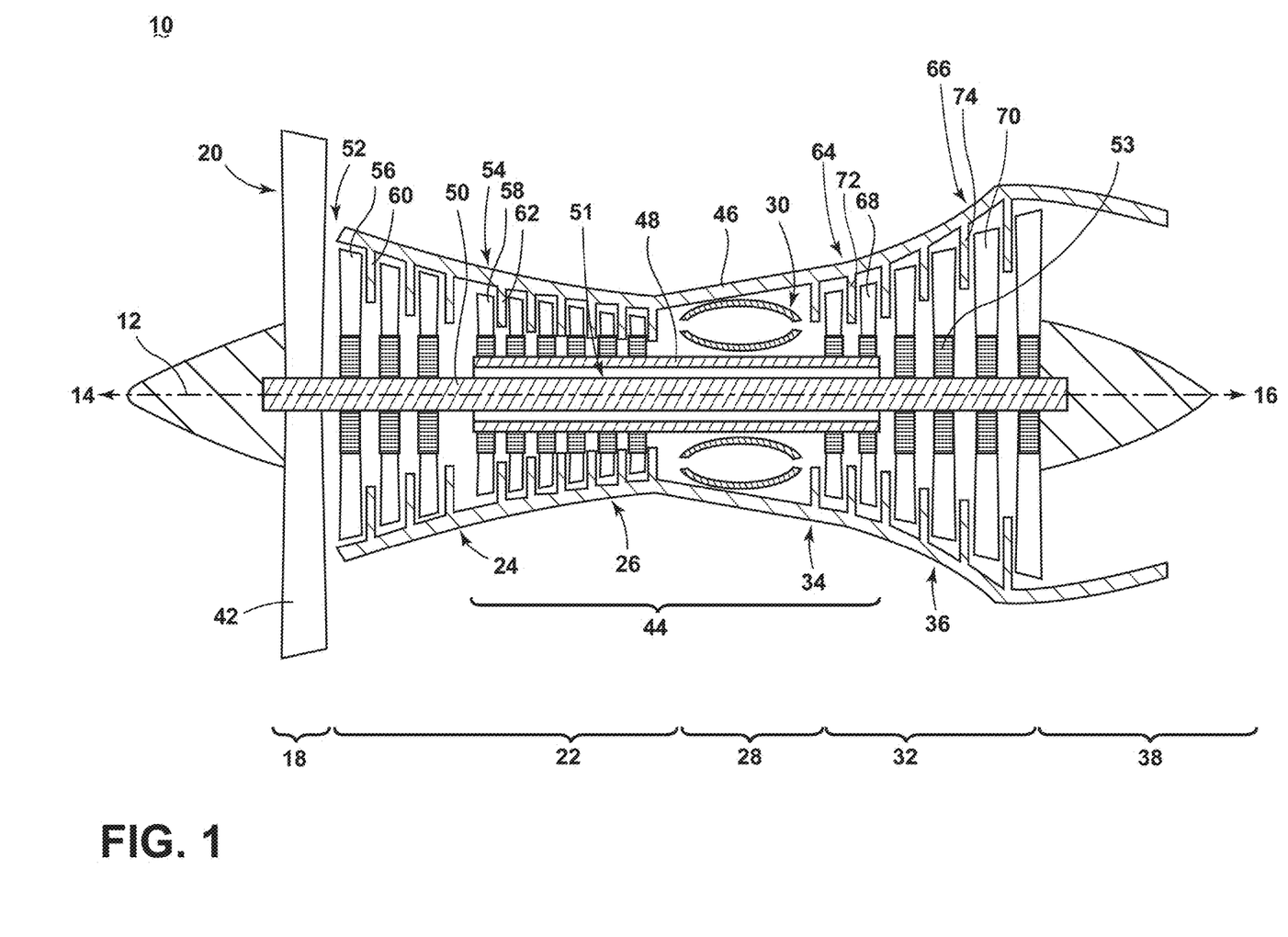
FIG. 1 is a schematic, sectional view of a gas turbine engine core.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP)

compressor 26, a combustion section 28 including a combustor 30, a turbine section 32 including a HP turbine 34, and a LP turbine 36, and an exhaust section 38.

The fan 20 includes a plurality of fan blades 42 disposed radially about the centerline 12. The HP compressor 26, the combustor 30, and the HP turbine 34 form a core 44 of the engine 10. A core casing 46 surrounds the core 44.

A HP shaft 48 disposed coaxially about the centerline 12 of the engine 10 drivingly connects the HP turbine 34 to the HP compressor 26. A LP shaft 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the shafts 48, 50 are referred to individually or collectively as a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP shafts 48, 50, with each stage having its own disk. The vanes 60, 62 are mounted to the core casing 46 in a circumferential arrangement about the rotor 51.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP shaft 50 to rotate the fan 20 and the LP compressor 24.

Some of the ambient air supplied by the fan 20 can bypass the engine core 44 and be used for cooling of portions of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26.

Figure 2:
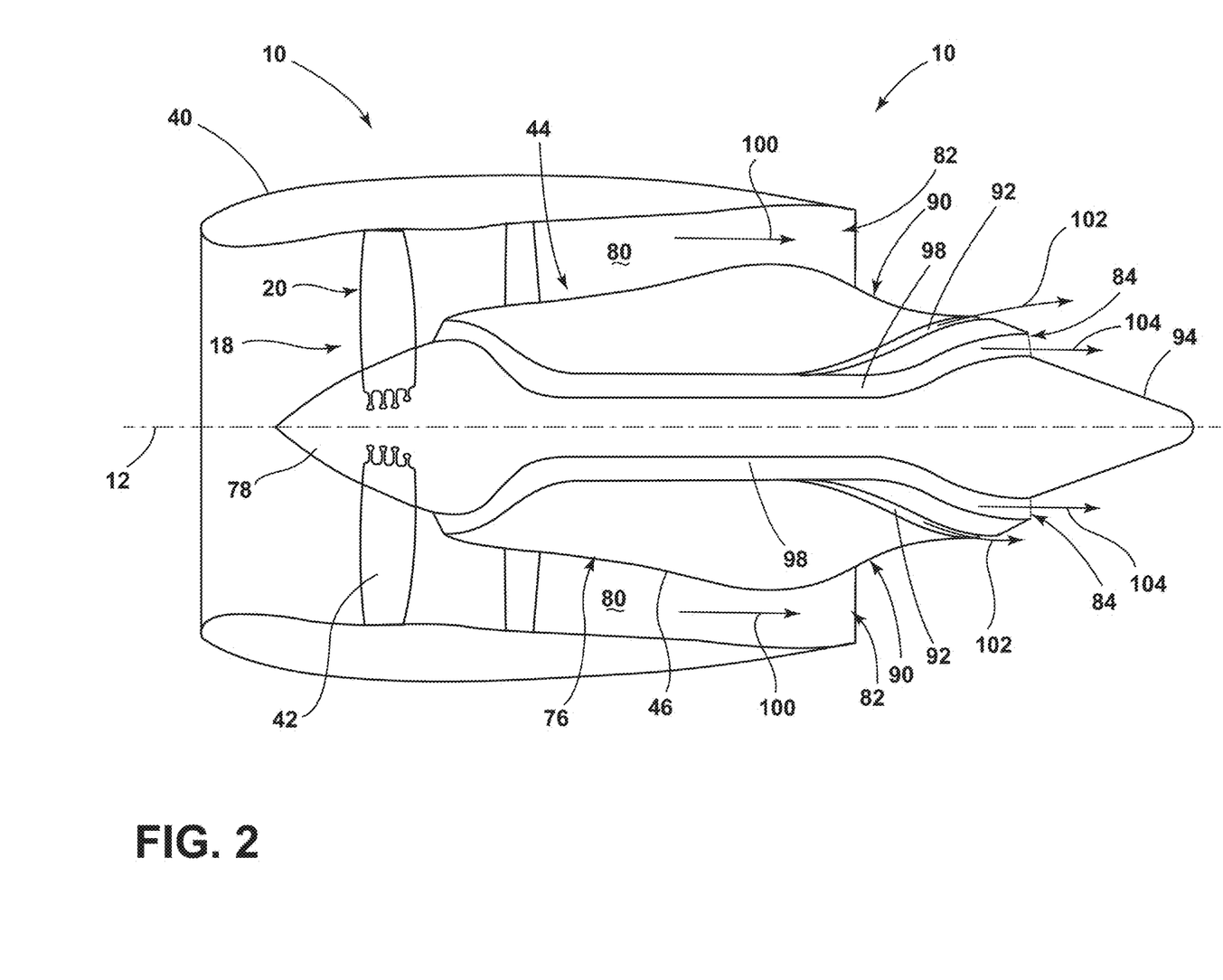
FIG. 2 is a schematic view of illustrating core cowlings surrounding the core of FIG. 1.

FIG. 2 schematically represents the gas turbine engine 10 shown as a high bypass gas turbine engine, best illustrating cowling structures surrounding the engine core 44. The engine 10 includes a fan cowling 40 and a core cowling 76. The fan section 18 further includes a nose 78 to which the blades 42 mount. A large portion of the air that is drawn into the fan assembly 18 is bypassed to the rear of the engine 10 to generate additional engine thrust. The bypassed air passes through an annular-shaped bypass channel 80 between the fan cowling 40 and the core cowling 76 and exits the bypass channel 80 through a fan outlet 82. The bypass channel 80 can comprise an angular dimension. The core cowling 76 defines the radially inward boundary of the bypass channel 80, and provides a transition surface to a core outlet 84 that extends aft from the core engine 44 such that fluid exhausted from the core engine 44 can pass along a tail 94 defining the exhaust section 38 downstream of and in axial arrangement with the core 44.

The core cowling 76 can further comprise a channel 92. The channel 92 can be disposed within the core cowling 76, in fluid communication with the internal components of the engine core 44. The channel 92 exhausts aft of and adjacent to the end of the concave section 90 between the fan outlet 82 and the core outlet 84 through the channel 92. Fluid provided through the compressor section 22, the combustor 30, and the turbine section 32 can pass along an inner mainstream channel 98 and exhaust through the core outlet 84. The core cowling 76 can be shaped to affect the airflows exhausting from the engine 10 and can comprise a concave section 90. The concave section 90 comprises an annular, concave, cross-sectional geometry relative to the engine centerline 12 and can begin forward or aft of the aft end of the fan cowling 40 and extends aft of the fan cowling 40.

During operation, the airflow passing through the engine 10 is utilized to generate thrust, and is exhausted aft of the engine 10. Three distinct airflows comprising a bypass airflow 100, a cooling channel airflow 102, and a core exhaust airflow 104 comprise the exhaust airflow for the engine 10. The airflows can be annular, exhausting around the circumference of the engine 10. The bypass airflow 100 is exhausted from the bypass channel 80 as provided by the fan section 18 and comprises the radially outer-most airflow. The core exhaust airflow 104 exhausts from the combustor 30 and the turbine section 32 to generate thrust for the engine 10, and can have a high temperature. The cooling exhaust airflow 102 is exhausted form the channel 92 and is disposed between the bypass airflow 100 and the core exhaust airflow 104. The cooling exhaust airflow 102 can initially separate the bypass airflow 100 from the core exhaust airflow 104, as the exhausted fluid will eventually mix out downstream of the engine 10.

It should be appreciated that the airflows exhausting from the engine can be of varying temperatures and speeds relative to one another. Typically, the core exhaust airflow 104 has a higher temperature relative to the other airflows, being heated by the combustor 30. Furthermore, the cooling exhaust airflow 102 typically is exhausted at a speed slower than the other exhaust flows, having a velocity significantly lower than the speed of sound (Mach=1 speed), while the bypass airflow 100 and the core exhaust airflow speeds are typically near or exceeding the speed of sound.

Furthermore, the outlet geometry of the engine 10, such as the geometry for the fan cowling 40, the core cowling 76, and the tail 94 in combination with the core 44 can comprise a decreasing cross-sectional area to accelerate the airflow as it is exhausted from the engine 10, providing additional thrust. As such, airflow within the engine 10 can be held below the speed of sound, while an exhaust nozzle or an exit nozzle structure can accelerate the airflow to near or greater than the speed of sound as the air exhausts, generating additional engine thrust.

Figure 3:
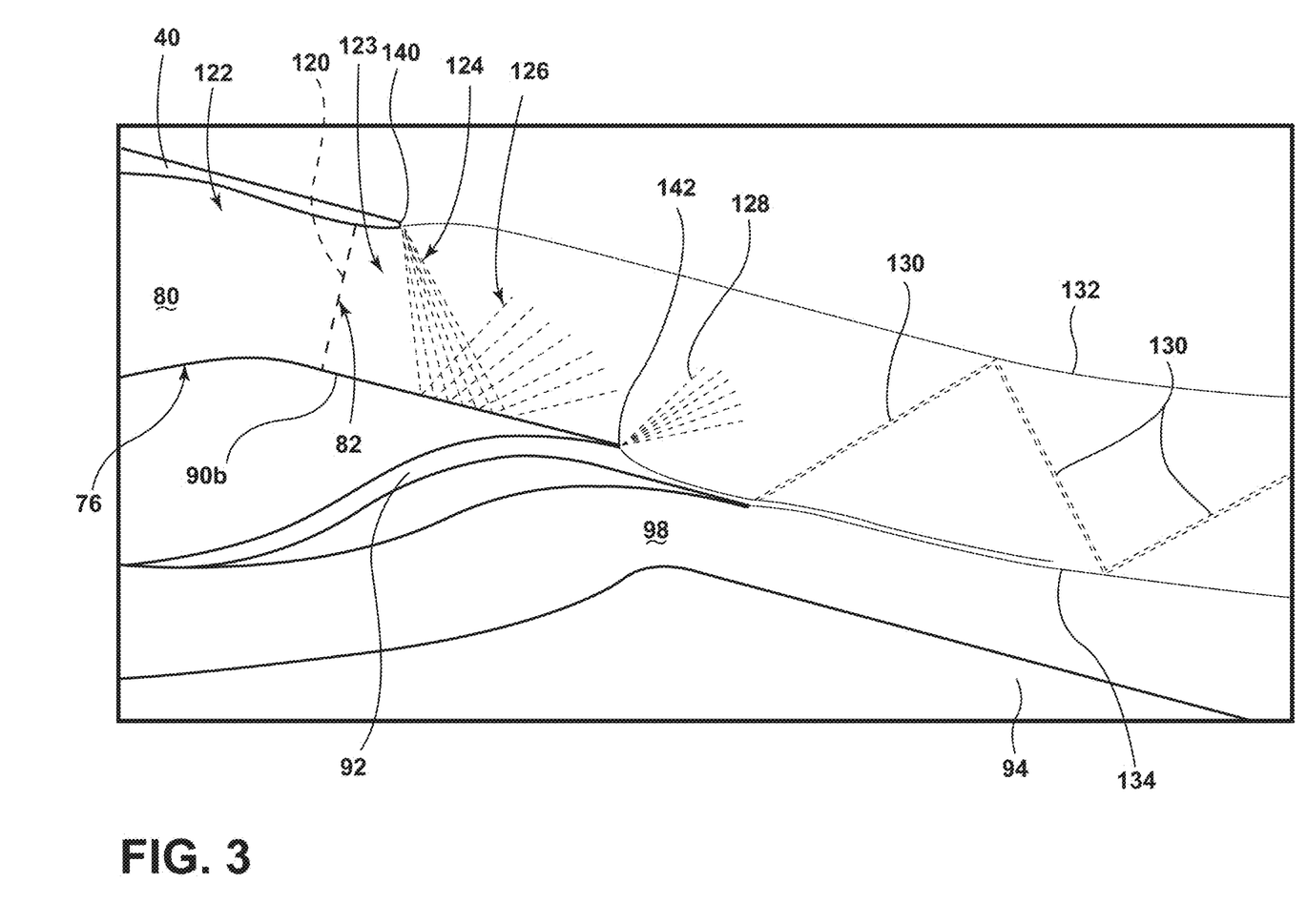
FIG. 3 is a schematic view of an exhaust section of the engine illustrating a subsonic region and a supersonic region for a typical exhaust system.

Turning to FIG. 3, the engine exhaust structure is shown illustrating the airflow after exhausting from the bypass channel 80. It should be appreciated that the engine shown in FIG. 3 comprises a flat section 90b as compared to the concave section 90 of FIG. 2. The airflow from the bypass channel 80 feeds the fan outlet 82. The fan outlet 82 can further be defined by a decreasing cross-sectional area such that a minimum cross-sectional area defines a nozzle 120. The fan outlet 82 can further define a subsonic region 122 upstream of the nozzle 120 and a supersonic region 123 downstream of the nozzle 120. The decreasing cross-sectional area accelerates the flow of air from the bypass channel 80 such that the airflow within the subsonic region 122 is accelerated from a velocity less than the speed of sound to a velocity at or greater than the speed of sound as the airflow enters the fan outlet 82 in the supersonic region 123.

The cowlings 40, 76 terminate at an annular edge from which the airflows exhaust. The end of the fan cowling 40 comprises a convex-shaped nozzle edge 140 or corner. Airflow passing through the core outlet 84 at the nozzle edge 140 results in supersonic expansion, such as Prandtl-Meyer expansion, at the nozzle edge 140. The supersonic expansion is a centered expansion process that occurs when a supersonic flow turns around a convex corner, such as the nozzle edge 140. As can be appreciated in FIG. 3, as the flow of air through the supersonic region 123 turns around the nozzle edge 140 and forms an expansion fan 124 extending from the convex nozzle edge 140. The expansion fan 124 creates pressure drops in the form of a supersonic shock wave created at the nozzle edge 140 resultant of the supersonic expansion. The fan 124 expands toward the core cowling 76 and is reflected at the flat section 90b into a reflected fan 126. Additionally, the end of the core cowling 76 terminates at a convex corner or edge 142, generating another shock wave 128. Both shock waves 124, 128 can move downstream within the airflows exhausting from the engine 10. The shock waves 124, 128 and the reflections thereof are supersonic shock waves, reflected between airflow paths or off of engine components such as the core cowling 76. The shock waves reduce aerodynamic exhaust performance of the engine 10, reducing overall efficiency. As such, it should be appreciated that minimizing the effect of the shock waves is desirable.

The airflow exhausted from the bypass channel 80 has a different velocity relative to the air speeds radially inside and outside of it. As such, a radially outer edge 132 and a radially inner edge 134 are defined by the difference in adjacent air speeds. Thus, the shock waves 124, 126, 128, 130 can reflect between the edges 132, 134 having a plurality of reflected shock waves as the airflow moves downstream from the engine 10. As the exhaust flows turn around the edges 140, 142, the shock waves 124, 128 and reflections thereof 126, 130 sequentially increase and decrease airflow pressure, leading to a loss of aerodynamic efficiency. Furthermore, the high speed flow causes excessive scrub drag over the exhaust surfaces and further deteriorates aerodynamic performance.

Figure 4:
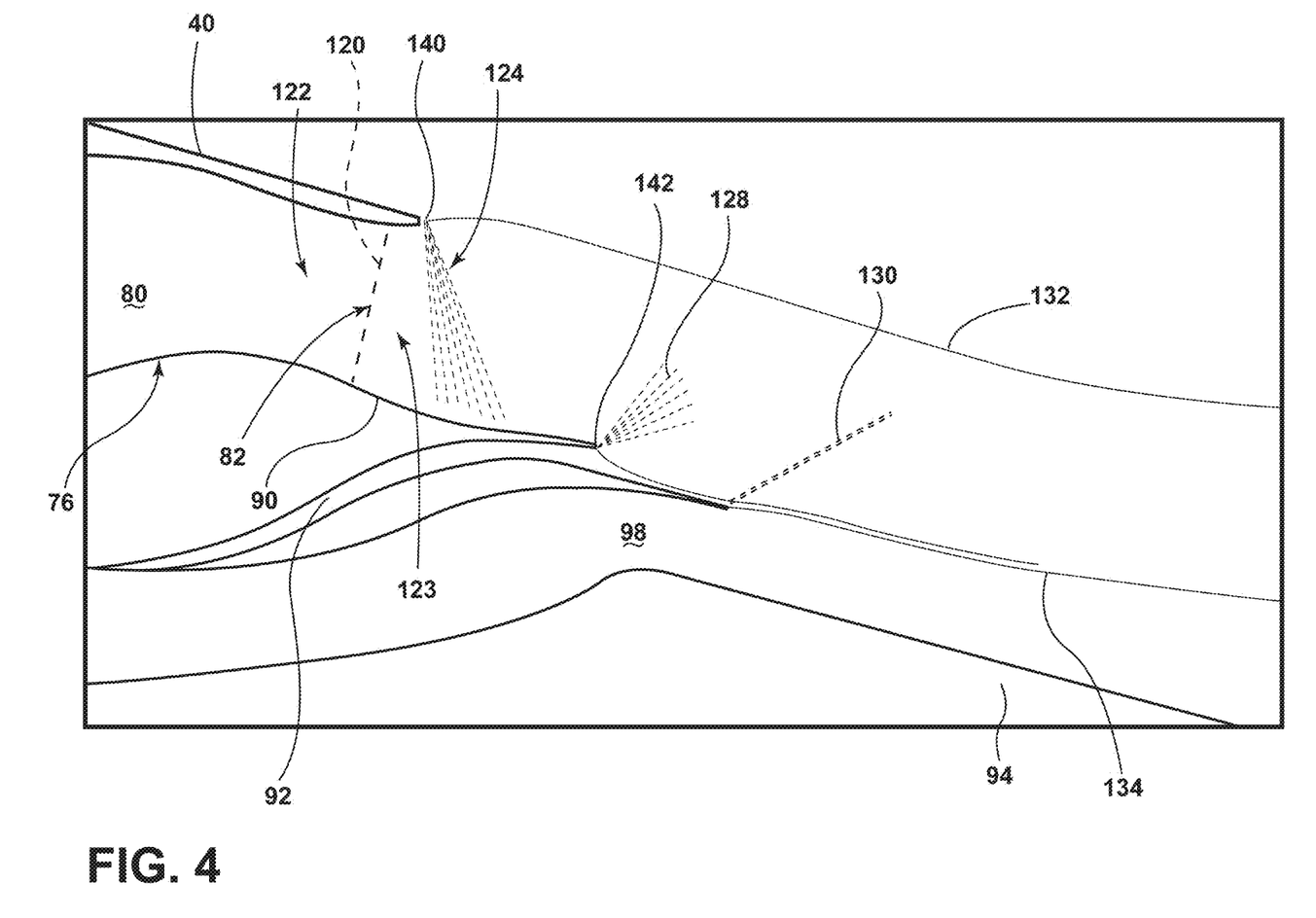
FIG. 4 is a schematic view illustrating a subsonic region and a supersonic region for the concave core cowling of FIG. 2.

Turning to FIG. 4, the inner core cowling 76 comprises the concave section 90, as comparable to the flat section 90b of FIG. 3, providing deceleration of the fan stream to reduce the strength of the shock waves and reflections thereof as shown in FIG. 3. The airflow from the bypass channel 80 passes through the nozzle 120 accelerating the flow of air from the subsonic region 122 to at or greater than the speed of sound in the supersonic region 123. It should be appreciated that the nozzle 120 can be defined within the concave section 90 or upstream of the concave section 90. As such, the concave section 90 can be present for at least a portion of the subsonic region 122 and the supersonic region 123.

It should be further appreciated that the flow of air within the bypass channel 80 is accelerated to from subsonic to supersonic at a transition between the regions 122, 123. At the transition, the flow of air within the subsonic region 122 is accelerated to the speed of sound and defines the beginning of the supersonic region 123. The transition between regions 122, 123 can occur at or before the nozzle 120, and can occur along the concave section 90 of the core cowling 76, or can occur upstream of the beginning of the concave section 90.

In FIG. 4, similar to FIG. 3, the supersonic airflow passing along the convex nozzle edge 140 and the core cowling edge 142 generates the first shock wave 124 and the second shock wave 128 as well as the reflected shock wave 130. The addition of the concave section 90 of the core cowling 76, as comparable to the flat section 90b of FIG. 3, reduces the strength and effect of the shock waves by allowing for deceleration of the fan airflow. If the flow turns around a concave corner, an oblique shock wave is produced. As the flow passes through the shock, its pressure increases and the flow is decelerated (supersonic compression). However, entropy increases across the oblique shock leading to a loss of compression efficiency. However, when the compression is done over a smooth concave surface, instead of a concave corner, the compression is done through an infinite number of infinitesimally weak Mach waves. The entire process is isoentropic and thus the most efficient. The overall performance loss from the created and reflected shock waves is minimized. The effect of compression increases with the increase of wall curvature, up to coalescence of Mach waves. It is contemplated that the transition from a subsonic speed to a supersonic speed occurs forward of the radial expanse of the concave section 90.

Figure 5:
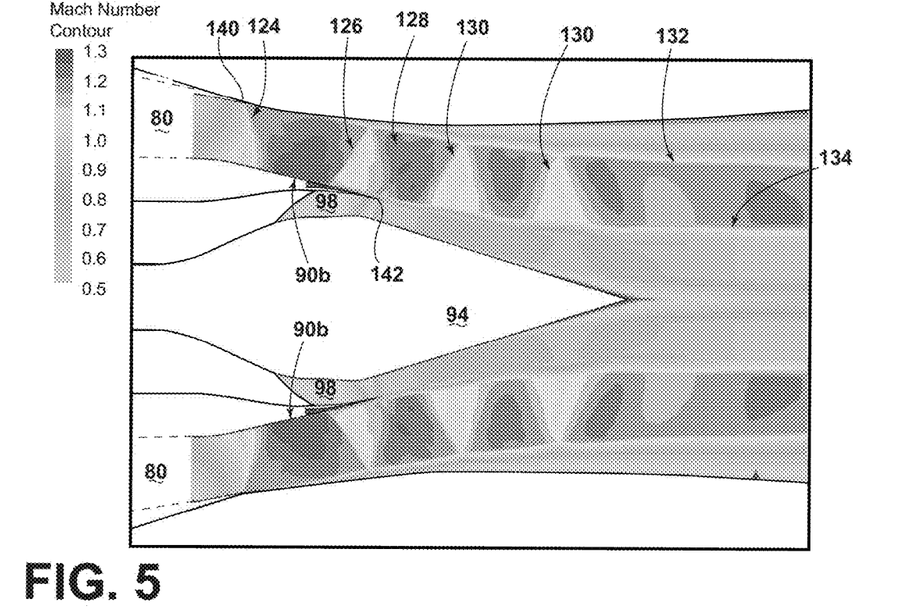
FIG. 5 is a gradient view illustrating shock waves from the typical exhaust system of FIG. 3.
Figure 6:
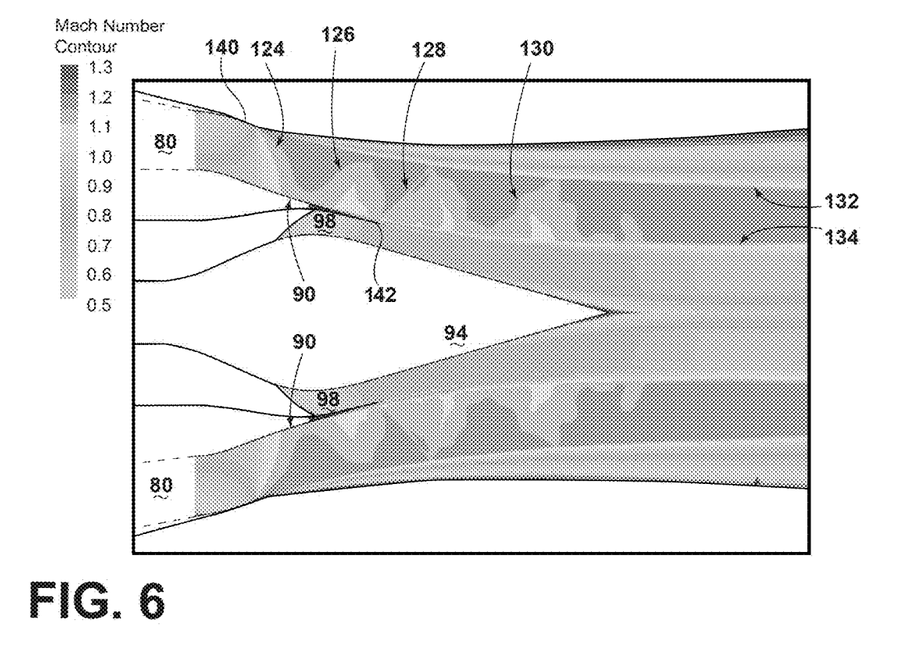
FIG. 6 is a gradient view illustrating shock waves from the concave core cowling of FIG. 4.

Turning now to FIG. 5, a contour chart illustrates the effect of the shock waves 124, 126, 128, 130 created by the supersonic expansion and reflected shock waves from the flat section 90b of the core cowling 76 of FIG. 3. A Mach Number Contour illustrates the relative airspeeds of the airflows exhausting from the engine. The air exhausting from the bypass channel 80 accelerates to at least the speed of sound, generating shock waves at both edges 140, 142. The generated shock waves reflect between the inner and outer edges 132, 134, generating a plurality of supersonic shock waves and reflected shock waves 130 as the air is exhausted from the bypass section 80. The strength of the shock waves can be understood by the speed difference illustrated in the Mach Number Contours between the reflected shock waves. Turning now to FIG. 6 comprising the concave section 90, in comparison to that of FIG. 5, it should be understood that the strength of the shock waves generated from the bypass section 80 as well as the amount of reflected shock waves 130 downstream decreases. The shock waves created have a significantly smaller difference in Mach Number Contour as well as dissipate closer to the tail 94.

Figure 7:
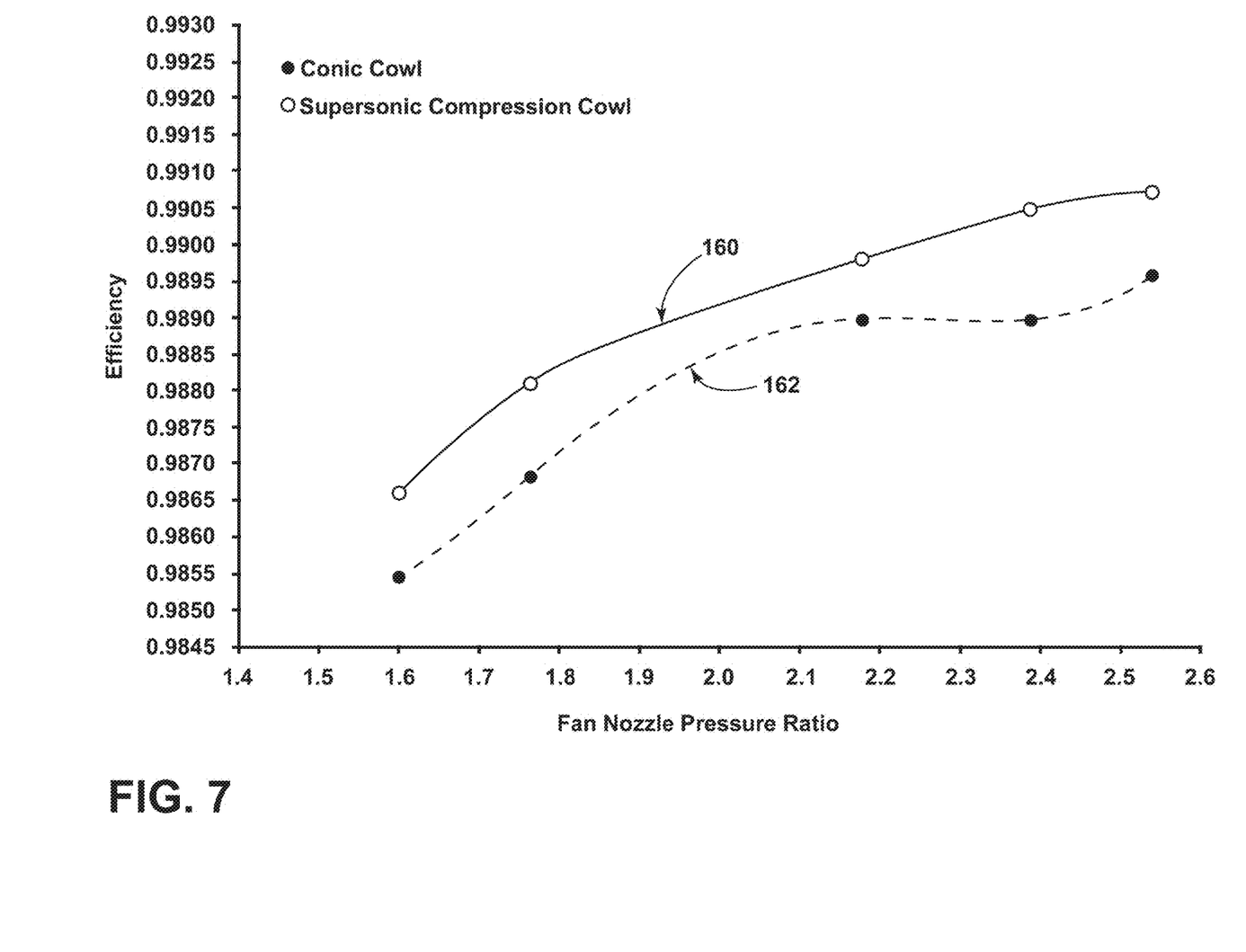
FIG. 7 is a plot illustrating efficiency over the fan nozzle pressure ratio of the typical exhaust system of FIG. 5 and the concave core cowling of FIG. 6.

Looking at FIG. 7, a plot illustrates an efficiency for the typical core cowling at 162 comprising the flat section 90*b* of the core cowling 76 in comparison to an efficiency for the concave section 90 of the core cowling 76 at 160. As can be appreciated, the overall efficiency based upon a fan nozzle pressure ratio increases over a wide range of pressure ratios with the implementation of the concave section 90. The efficiency can be attributed to the overall reduction of the strength of the shock waves by decreasing the fan stream velocity with the concave core cowling. The exhaust airstream is streamlined and minimizes the negative effects of the local shock waves generated at the exhaust area of the engine 10. For the subsonic flows (low nozzle pressure ratios) no shock waves are present but the concave cowling decelerates the flow reducing the overall friction drag.

It should be appreciated that the concave core cowling structure for the engine provides for airflow deceleration. The deceleration of the airflow reduces the strength of aerodynamic shock waves as the supersonic airflow passes over the corners of the fan and core cowlings of the engine. The shock waves create aerodynamic losses which can decrease engine performance and therefore, efficiency. The reduction of the shock waves increases the airflow streamline being exhausted from the engine and increases overall engine efficiency. Furthermore, static pressure adjacent to exhaust surfaces increases with the concave surface, which can increase physical thrust of the engine.

Furthermore, the concave structure for the core cowling provides for a reduction of wall shear, a reduced-length tail section, and a reduced length for the overall exhaust section for the engine. The reduced length of the tail section provides for a reduced overall engine weight and size, which can increase overall engine efficiency.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A high bypass gas turbine engine comprising:
    a core comprising a compressor section, combustion section, and turbine section in axial flow arrangement;
    a fan section upstream of and in axial flow arrangement with the core;
    an exhaust section downstream of and in axial flow arrangement with the core;
    a core cowling surrounding the core and a portion of the exhaust section, and spaced from the exhaust section to define a core outlet between the core cowling and the exhaust section; and
    a fan cowling surrounding the fan section and a portion of the core cowling, and spaced from the core cowling to define an annular bypass channel having a fan outlet between the fan cowling and the core cowling at an aft end of the fan cowling;
    wherein the core cowling has an annular concave cross section relative to and facing the annular bypass channel, and the annular concave cross section is positioned at the fan outlet and at least partially upstream of the fan outlet.

2. The high bypass gas turbine engine of claim 1 wherein the bypass channel has a subsonic flow region and the annular concave cross section is present for at least a portion of the subsonic flow region.

3. The high bypass gas turbine engine of claim 2 wherein the bypass channel has a supersonic flow region and the annular concave cross section is present for at least a portion of the supersonic flow region.

4. The high bypass gas turbine engine of claim 3 wherein the bypass channel has a subsonic to supersonic transition between the subsonic and supersonic flow regions and the annular concave cross section is present at least at the subsonic to supersonic transition.

5. The high bypass gas turbine engine of claim 4 wherein the annular concave cross section spans the subsonic to supersonic transition.

6. The high bypass gas turbine engine of claim 5 wherein the annular concave cross section extends downstream of the fan outlet.

7. The high bypass gas turbine engine of claim 6 wherein the annular concave cross section terminates at the core outlet.

8. A cowling assembly for a high bypass gas turbine engine comprising:
    a core cowling; and
    a fan cowling surrounding at least a portion of the core cowling and including an aft edge, and the fan cowling spaced from the core cowling to define an annular bypass channel having a fan nozzle outlet between the fan cowling and the core cowling;
    wherein the core cowling has an annular concave cross section relative to and confronting the annular bypass channel, and the annular concave cross section extending downstream of the fan nozzle outlet; and
    wherein the annular concave cross section is positioned where Prandtl-Meyer expansion, generated at the fan cowling aft edge, contacts the core cowling.

9. The cowling assembly of claim 8 wherein the annular bypass channel has a subsonic flow region and the annular concave cross section is present for at least a portion of the subsonic flow region.

10. The cowling assembly of claim 9 wherein the annular bypass channel has a supersonic flow region and the annular concave cross section is present for at least a portion of the supersonic flow region.

11. The cowling assembly of claim 10 wherein the annular bypass channel has a subsonic to supersonic transition between the subsonic and supersonic flow regions and the annular concave cross section is present at least at the subsonic to supersonic transition.

12. The cowling assembly of claim 11 wherein the annular concave cross section spans the subsonic to supersonic transition.

13. The cowling assembly of claim 12 wherein the annular concave cross section extends downstream of the fan outlet.

14. The cowling assembly of claim 13 wherein the annular concave cross section terminates at a downstream end of the core cowling.

15. The cowling assembly of claim 8 wherein the annular concave cross section extends about a circumference of the core cowling.

16. A core cowling for a high bypass gas turbine engine with an outer surface and an inner surface, the high bypass gas turbine engine including a fan cowling spaced from the core cowling by an annular bypass channel confronting the outer surface, the core cowling comprising:
- a subsonic region defined along the outer surface;
- a supersonic region defined along the outer surface;
- an intervening transition transitioning defined along the outer surface between the subsonic region and the supersonic region; and
- an annular concave cross section formed in the outer surface and present at least at the intervening transition.

17. The core cowling according to claim 16 wherein the annular concave cross section is either one of downstream or upstream of the intervening transition.

18. The core cowling according to claim 16 wherein the annular concave cross section spans the intervening transition.

\* \* \* \* \*